(12) United States Patent
Ku et al.

(10) Patent No.: US 8,595,785 B2
(45) Date of Patent: Nov. 26, 2013

(54) SYSTEM AND METHOD FOR MANAGING TERMINAL PROVISIONING

(75) Inventors: Tai Yeon Ku, Daejeon (KR); Bong Jin Oh, Daejeon (KR); Eui Hyun Paik, Daejeon (KR); Dong Won Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 42 days.

(21) Appl. No.: 13/294,783

(22) Filed: Nov. 11, 2011

(65) Prior Publication Data

US 2012/0131604 A1 May 24, 2012

(30) Foreign Application Priority Data

Nov. 22, 2010 (KR) .................. 10-2010-0116118

(51) Int. Cl.
*H04N 7/173* (2011.01)
*H04N 7/16* (2011.01)
*G06F 9/44* (2006.01)

(52) U.S. Cl.
USPC .............. 725/132; 725/25; 725/110; 717/172

(58) Field of Classification Search
None
See application file for complete search history.

(56) References Cited

U.S. PATENT DOCUMENTS

| 2003/0048380 A1* | 3/2003 | Tamura ..................... 348/552 |
| 2009/0144783 A1* | 6/2009 | Lee et al. ..................... 725/93 |
| 2010/0199321 A1* | 8/2010 | Fan ............................ 725/112 |

FOREIGN PATENT DOCUMENTS

| KR | 1020090046055 A | 5/2009 |
| KR | 1020090121520 A | 11/2009 |

* cited by examiner

*Primary Examiner* — Chris Parry

(57) ABSTRACT

A method for provisioning technology which ensures an IPTV terminal's easy switch to IPTV enterprisers, and suggests terminal configuration procedures independent of IPTV enterprisers includes a terminal initial setting in which the terminal is booted and is physically connected to a network and software stacks for terminal provisioning are initialized, network connection performed after an IP address is assigned by transmitting a discovery message to a DHCP server, enterpriser search and selection, enterpriser access, installation of extended packages for each enterpriser, IPTV service initiation, and service unsubscribing.

15 Claims, 9 Drawing Sheets

SYSTEM AND METHOD FOR MANAGING TERMINAL PROVISIONING

CROSS-REFERENCE TO RELATED APPLICATIONS

This application claims priority to and the benefit of Korean Patent Application No. 10-2010-0116118 filed in the Korean Intellectual Property Office on Nov. 22, 2010, the entire contents of which are incorporated herein by reference.

BACKGROUND OF THE INVENTION

1. Field of the Invention

The present invention relates to system and method for managing terminal provisioning, and more particularly, to system and method for managing IPTV terminal provisioning.

2. Description of the Related Art

Presently, the tasks of most of the real-time application programs executed in computers have a structure of transmitting results to a user within a time targeted by the user while periodically being executed. A target response time is tacitly expected at task execution periods or designated by a user.

Now, IPTV terminal markets are dependent on IPTV enterprisers. Users are not allowed the freedom to select an IPTV terminal, which is unilaterally provided by enterprisers.

Furthermore, when IPTV enterprisers are switched, it is impossible to use an existing terminal, such that it is inconvenient in that the existing IPTV terminal has to be replaced with a new terminal. When the IPTV enterpriser is switched, the switching of the IPTV enterpriser is not quickly performed because of a terminal replacement or the like, thereby causing inconvenience to a user. In order to resolve such problems, an enterpriser-independent IPTV terminal must be provided. For this, it is necessary for a user to buy a terminal in retail markets and configure the terminal to match with an IPTV enterpriser the user wants to select.

SUMMARY OF THE INVENTION

The present invention has been made in an effort to provide a system and method for managing terminal provisioning which ensure an IPTV terminal can easily switch IPTV enterprisers.

An exemplary embodiment of the present invention provides a system for managing terminal provisioning, including: an initialization unit for initializing a broadcast service provision terminal; a broadcast selection unit for selecting a broadcast service registered in the initialized terminal; an authentication unit for authenticating the terminal for providing the selected broadcast service and the selected broadcast service; and a preparation procedure performance unit for performing a service preparation procedure for providing the authenticated broadcast service through the authenticated terminal.

The system may further include a subscription determination unit for determining whether to subscribe to the broadcast service to be provided through the initialized terminal. More preferably, the system may further include a broadcaster information acquisition unit for acquiring broadcaster information related to the corresponding broadcast service when subscription to the broadcast service to be provided is not made; and a broadcast service subscription unit for subscribing to the corresponding broadcast service based on the acquired broadcaster information.

The authentication unit may include a provisioning server connection unit for connecting to a provisioning server of a corresponding broadcaster based on broadcaster information about the broadcaster which provides the selected broadcast service; a terminal authentication unit for authenticating the terminal depending on whether the terminal connected to the provisioning server is an illegal terminal; and a broadcast service authentication unit for authenticating the broadcast service depending on whether the terminal connected to the provisioning server subscribes to the broadcast service to be provided through the terminal connected thereto when the terminal is not an illegal terminal.

The preparation procedure performance unit may include a list request unit for requesting a software package list related to an operation of the authenticated broadcast service; a list generation unit for generating the software package list requested based on authentication information used to authenticate the terminal and the broadcast service; and a package installation unit for receiving and installing a corresponding software package based on the generated software package list.

The initialization unit may include a booting unit for booting the terminal; a network connection unit for physically connecting the booted terminal to a network; and a stack initialization unit for initializing software stacks for performance of terminal provisioning on the terminal connected to the network.

The system may further include a broadcast service initiation unit for initiating the corresponding broadcast service when the service preparation procedure is terminated; or a broadcast service unsubscribing unit for unsubscribing from the selected broadcast service of broadcast services registered in the terminal.

The broadcast service provision terminal may be an IPTV terminal, and may include a communication unit including agents for processing different communication protocols for performing communication using the agents included therein; a first instruction processing unit for processing terminal configuration instructions received through the agents; a terminal state collection unit for collecting state information of the terminal in real time by accessing to the terminal's module for performing a corresponding process whenever the terminal configuration instruction is processed; an object definition unit for defining objects for terminal management based on the collected state information; and a terminal state specification generation unit for generating terminal state specifications based on the defined objects; or may further include a second instruction processing unit for processing instructions of internal components for interfaces with the outside; and a software storing unit for collecting and storing software needed to operate the terminal.

Another exemplary embodiment of the present invention provides a method for managing terminal provisioning, the method including: an initialization step of initializing a broadcast service provision terminal; a broadcast selection step of selecting a broadcast service registered in the initialized terminal; an authentication step of authenticating the terminal for providing the selected broadcast service and the selected broadcast service; and a preparation procedure performance step of performing a service preparation procedure for providing the authenticated broadcast service through the authenticated terminal.

The method for managing terminal provisioning may further include a subscription determination step of determining whether to subscribe to the broadcast service to be provided through the initialized terminal. More preferably, the method may further include a broadcaster information acquisition step of acquiring broadcaster information related to the corresponding broadcast service when subscription to the broadcast service to be provided is not made; and a broadcast service subscription step of subscribing to the corresponding broadcast service based on the acquired broadcaster information.

The authentication step may include a provisioning server connection step of connecting to a provisioning server of a corresponding broadcaster based on broadcaster information about the broadcaster which provides the selected broadcast service; a terminal authentication step of authenticating the terminal depending on whether the terminal connected to the provisioning server is an illegal terminal; and a broadcast service authentication step of authenticating the broadcast service depending on whether the terminal connected to the provisioning server subscribes to the broadcast service to be provided through the terminal connected thereto when the terminal is not an illegal terminal.

The preparation procedure performance step may include a list request step of requesting a software package list related to an operation of the authenticated broadcast service; a list generation step of generating the software package list requested based on authentication information used to authenticate the terminal and the broadcast service; and a package installation step of receiving and installing a corresponding software package based on the generated software package list.

The preparation procedure performance step may include a list request step of requesting a software package list related to operation of the authenticated broadcast service; a list generation step of generating the software package list requested based on authentication information used to authenticate the terminal and the broadcast service; and a package installation step of receiving and installing a corresponding software package based on the generated software package list.

The initialization step may include a booting step of booting the terminal; a network connection step of physically connecting the booted terminal to a network; and a stack initialization unit of initializing software stacks for performance of terminal provisioning on the terminal connected to the network.

The method for managing terminal provisioning may further include a broadcast service initiation step of initiating the corresponding broadcast service when the service preparation procedure is terminated; or a broadcast service unsubscribing step for unsubscribing from the selected broadcast service of broadcast services registered in the terminal.

The present invention is to define provisioning procedures independent of enterprisers from existing terminal configuration dependent to enterprisers and unstandardized terminal provisioning procedures. According to the present invention, although a user buys a general IPTV terminal from retail markets, the user can be provided IPTV services at any time and anywhere as long as the terminal is connected to an IP network. Furthermore, the present invention can extend the range of the IPTV terminal from an existing set-top box to devices connectable to wired networks, such as a PC, a game console and the like. In addition, although an IPTV enterpriser has been switched, it is unnecessary to again buy an IPTV terminal, thereby improving re-utilization of the terminal. Furthermore, as the range of the terminal is extended, the user can buy a desired terminal, thereby expanding the range of user choice and providing user convenience.

DETAILED DESCRIPTION OF THE EMBODIMENTS

Figure 1:
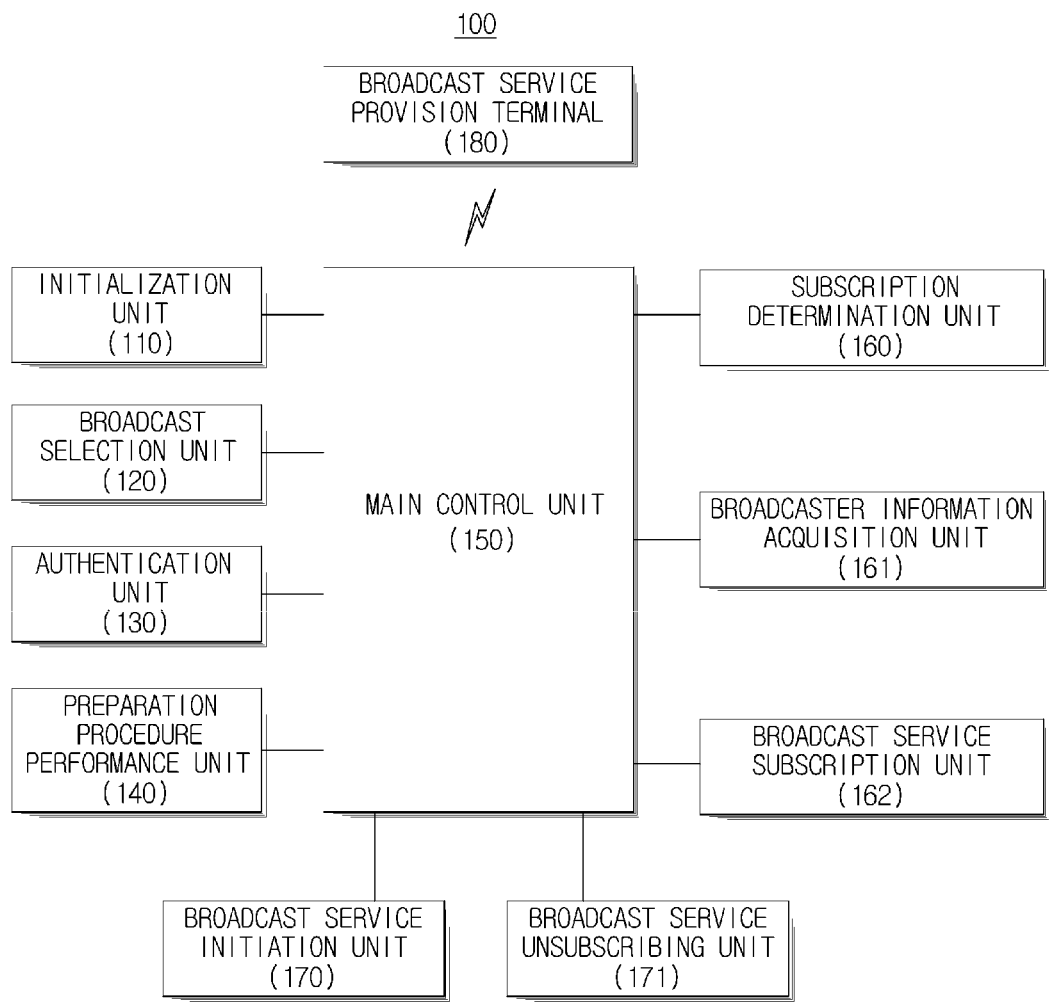
FIG. 1 is a block diagram schematically showing a system for managing provisioning for a terminal according to an exemplary embodiment of the present invention.

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. Further, in describing the present invention, well-known functions or constructions will not be described in detail since they may unnecessarily obscure the understanding of the present invention. Hereinafter, the exemplary embodiments of the present invention will be described, but it will be understood to those skilled in the art that the spirit and scope of the present invention are not limited thereto and various modifications and changes can be made.

The present invention relates to a procedure and a method for provisioning technology which ensure an IPTV terminal's easy switch to IPTV enterprisers, and suggests terminal configuration procedures independent of IPTV enterprisers. The present invention includes terminal initial setting in which the terminal is booted and is physically connected to a network and software stacks for terminal provisioning are initialized, network connection performed after an IP address is assigned by transmitting a discovery message to a DHCP server, enterpriser search and selection, enterpriser access, installation of extended packages for each enterpriser, IPTV service initiation, service unsubscribing and the like, as the provisioning procedures of the IPTV terminal. According to the present invention, it is possible to extend the IPTV terminal from an existing set-top box to devices connectable to wired networks, such as a PC, a game console and the like, and configure a terminal independent of enterprisers unlike existing terminals dependent to the enterprisers.

Figure 2:
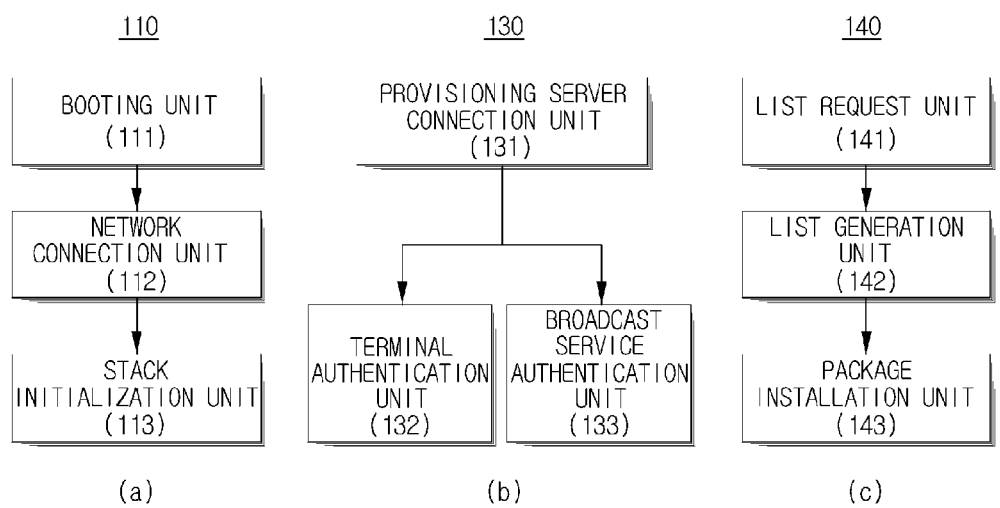
FIG. 2 is a block diagram showing the internal configuration in detail of the system for managing provisioning for a terminal.
Figure 3:
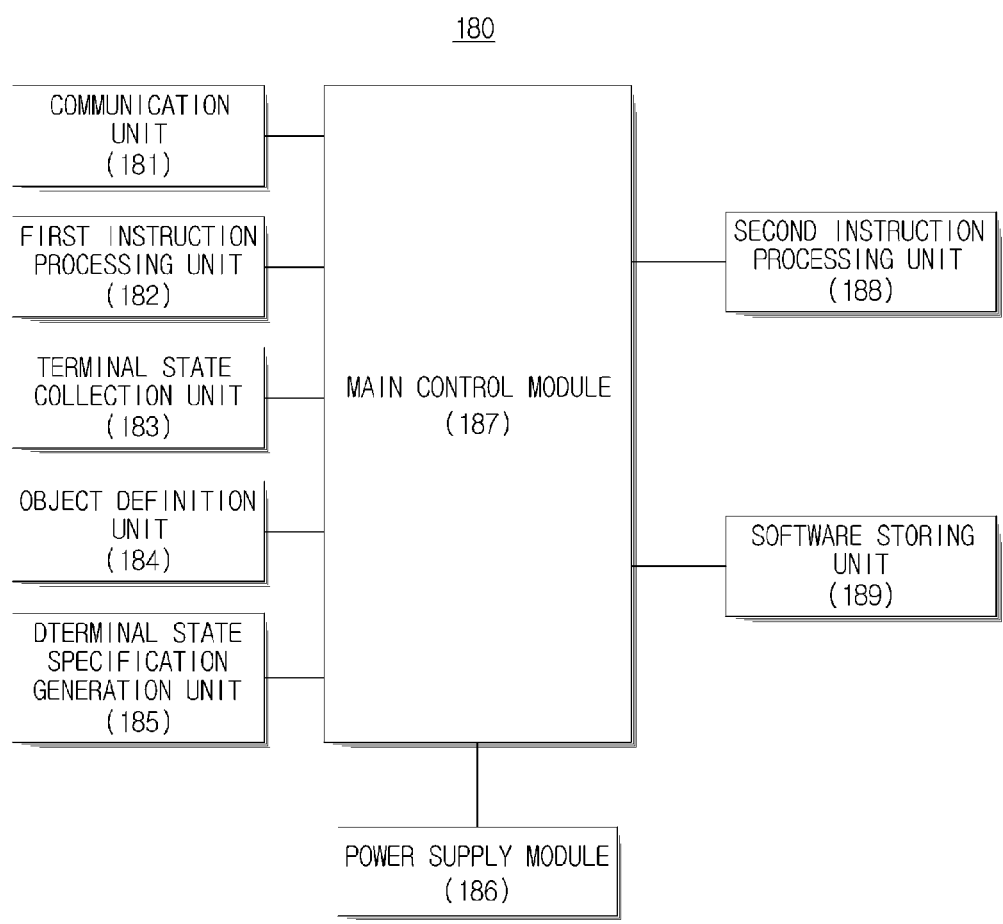
FIG. 3 is a block diagram showing the internal configuration in detail of a broadcast service provision terminal.

FIG. 1 is a block diagram schematically showing a system for managing provisioning for a terminal according to an exemplary embodiment of the present invention. FIG. 2 is a block diagram in detail showing the internal configuration of the system for managing provisioning for a terminal. FIG. 3 is a block diagram in detail showing the internal configuration of a broadcast service provision terminal. The following description will be described with reference to FIGS. 1 and 3.

Referring to FIG. 1, the system 100 for managing terminal provisioning includes an initialization unit 110, a broadcast selection unit 120, an authentication unit 130, a preparation procedure performance unit 140 and a main control unit 150. The system 100 may provided in a apparatus, for example, set-top box.

The system 100 for managing terminal provisioning is a system for increasing re-utilization of the IPTV terminal, and performing a procedure for configuring a terminal independent of enterprisers. The system 100 for managing terminal provisioning defines the provisioning protocol of a terminal including TR069, and proposes terminal initialization settings, network connection, enterpriser search, enterpriser selection, enterpriser authentication for enterpriser access, service preparation steps through an extended package installation step for each enterpriser and the like as terminal management procedures therethrough.

The initialization unit 110 performs a function of initializing a broadcast service provision terminal. In the exemplary embodiment, the broadcast service provision terminal means an IPTV terminal. In the exemplary embodiment, the initialization unit 110 may include a booting unit 111, a network connection unit 112 and a stack initialization unit 113 as shown in FIG. 2A. The booting unit 111 performs a function of booting the terminal. The network connection unit 112 performs a function of physically connecting the booted terminal to a network. The stack initialization unit 113 performs a function of initializing software stacks for performing terminal provisioning on the terminal connected to the network.

The broadcast selection unit 120 performs a function of selecting broadcast services registered in the initialized terminal.

The authentication unit 130 performs a function of authenticating the terminal for providing the selected broadcast service. In the exemplary embodiment, the authentication unit 130 may include a provisioning server connection unit 131, a terminal authentication unit 132 and a broadcast service authentication unit 133 as shown in FIG. 2B. The provisioning server connection unit 131 performs a function of accessing the provisioning server of a corresponding broadcaster based on broadcaster information about the broadcaster which provides the selected broadcast service. The terminal authentication unit 132 performs a function of authenticating the terminal depending on whether the terminal connected to the provisioning server is an illegal terminal. Information used for terminal authentication by the terminal authentication unit 132 includes, for example, a terminal ID assigned when the terminal is manufactured, the manufacturer ID of the terminal, a terminal model, MAC information and the like. The broadcast service authentication unit 133 performs a function of authenticating the broadcast service depending on whether the terminal connected to the provisioning server subscribes to the broadcast service to be provided through the terminal connected thereto when the terminal is not an illegal terminal.

The preparation procedure performance unit 140 functions to perform a service preparation procedure for provision of the authenticated broadcast service through the authenticated terminal. In the exemplary embodiment, the preparation procedure performance unit 140 may include a list request unit 141, a list generation unit 142 and a package installation unit 143 as shown in FIG. 2C. The list request unit 141 performs a function of requesting a software package list related to the operation of the authenticated broadcast service. The list generation unit 142 performs a function of generating the software package list requested based on authentication information used to authenticate the terminal and the broadcast service. The package installation unit 143 performs a function of receiving and installing a corresponding software package based on the generated software package list.

The main control unit 150 performs a function of controlling the overall operations of respective units constituting the system 100 for managing terminal provisioning.

The system 100 for managing terminal provisioning may further include a subscription determination unit 160. The subscription determination unit 160 performs a function of determining whether subscription to the broadcast service to be provided through the initialized terminal is made or not. When the terminal is the IPTV terminal, the subscription determination unit 160 may determine whether subscription is made or not using the file IPTVSPInfo.conf of the terminal. Meanwhile, considering the case where subscription to the broadcast service is not made, the system 100 for managing terminal provisioning may further include a broadcaster information acquisition unit 161 and a broadcast service subscription unit 162. The broadcaster information acquisition unit 161 performs a function of acquiring broadcaster information related to the corresponding broadcast service when subscription to the broadcast service is not made. The broadcaster information acquisition unit 161 acquires a broadcaster ID, the access address of the broadcaster provisioning and the like as broadcaster information. The broadcast service subscription unit 612 performs a function of subscribing to a corresponding broadcast service based on the acquired broadcaster information.

The system 100 for managing terminal provisioning may further include a broadcast service initiation unit 170 or a broadcast service unsubscribing unit 171. The broadcast service initiation unit 170 performs a function of initiating a corresponding broadcast service when the service preparation procedure has been terminated. The broadcast service unsubscribing unit 171 performs a function of unsubscribing from the selected broadcast service of the broadcast services registered in the terminal.

Meanwhile, the broadcast service provision terminal 180 may provide, when the terminal is the IPTV terminal, may include a communication unit 181, a first instruction processing unit 182, a terminal state collection unit 183, an object definition unit 184, a terminal state specification generation unit 185, a power supply module 186 and a main control module 187 as shown in FIG. 3. The communication unit 181 includes agents for processing different communication protocols and performs communication using the agents included therein. The first instruction processing unit 182 performs a function of processing terminal configuration instructions received through the agents.

The terminal state collection unit 183 performs a function of collecting state information of the terminal in real time by accessing to the terminal's module for performing a corresponding process whenever the terminal configuration instruction is processed. The object definition unit 184 performs a function of defining objects for terminal management based on the collected state information. The terminal state specification generation unit 185 performs a function of generating a terminal state specification based on the defined objects. The power supply module 186 performs a function of supplying power to the respective units constituting the broadcast service provision terminal 180. The power supply module 187 performs a function of supplying power to the respective units constituting the broadcast service provision terminal 180. Meanwhile, the broadcast service provision terminal 180 may include a second instruction processing unit 188 and a software storing unit 189. The second instruction processing unit 188 performs a function of processing the instructions of internal components for interfacing with the outside. The software storing unit 189 functions to collect and store software needed to operate the terminal.

Figure 4:
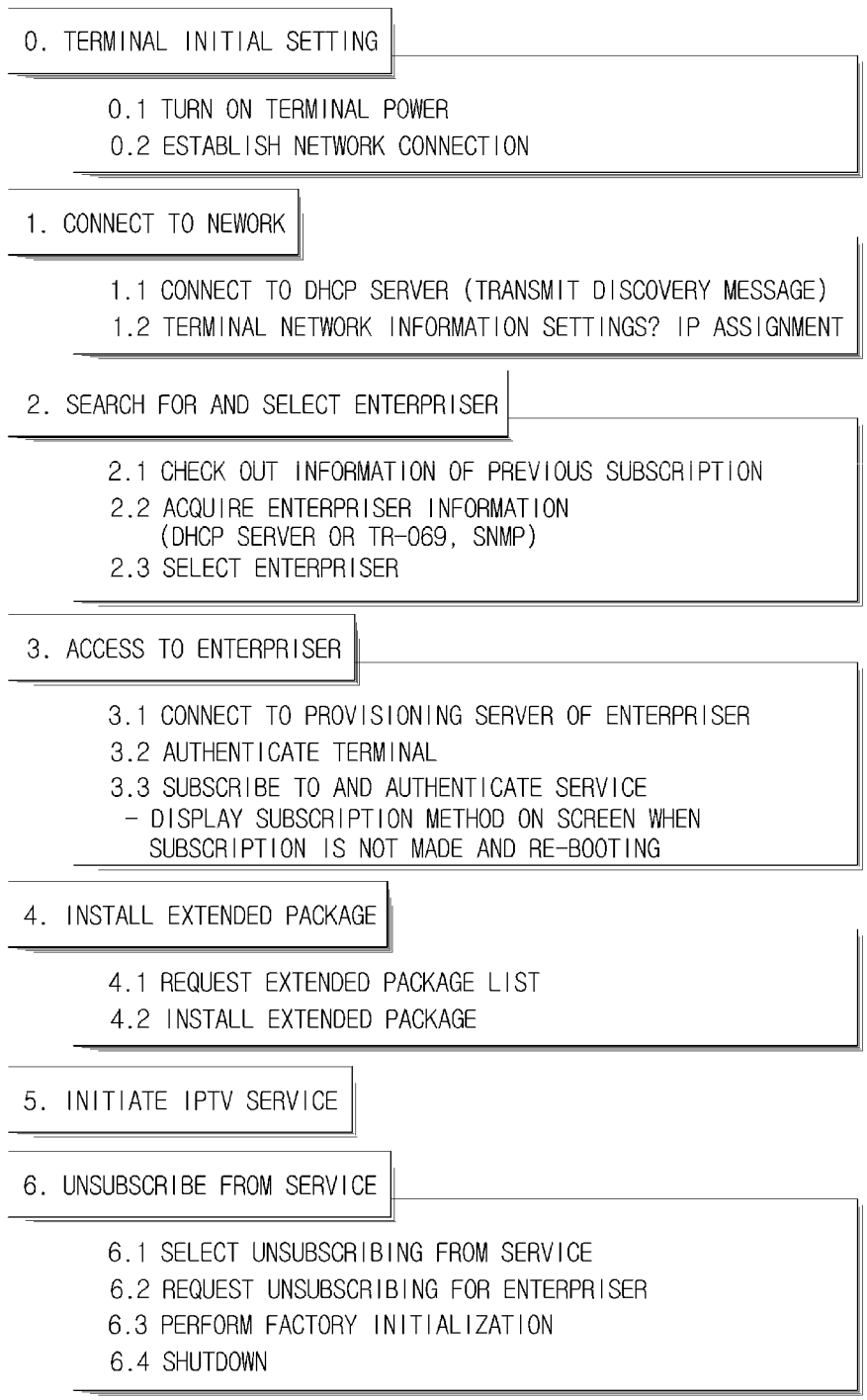
FIG. 4 is a diagram showing details for respective steps of the provisioning procedure of an IPTV terminal proposed by the system for managing provisioning for the terminal.

Next, the following description will be described by taking the system 100 for managing terminal provisioning as an example. The details for respective steps of the provisioning procedure of an IPTV terminal proposed by the system for managing terminal provisioning system according to an embodiment of the present invention are as shown in FIG. 4.

Terminal initial setting is a step in which the terminal is booted and is physically connected to a network and software stacks for terminal provisioning are initialized.

In the step of network connection, the terminal has to be assigned an IP address for network connection. When the terminal already has IP information, this step may be omitted. An IP assignment is performed by transmitting a discovery message to a DHCP server.

The step of searching for and selecting an enterpriser include a step of searching for an IPTV service provider and selecting an enterpriser from the searched information. In the case of a pre-subscribed terminal, this step may be omitted through information about previous subscription. To check the information about previous subscription, checking can be performed through file IPTVSPInfo.conf of the terminal. The reason for checking information about previous subscription is for providing rapid IPTV services to users by omitting the enterpriser information acquirement step and the enterpriser selection step. The terminal performs terminal authentication and service subscription authentication through the enterpriser access step based on the information about previous subscription.

The enterpriser information is acquired using a DHCP container and a TR-069 method. As the acquired enterpriser information, there are the enterpriser ID, the connection address for enterpriser provisioning and the like. When selection of a plurality of enterprisers is possible, enterpriser icons and related meta information may be needed in order to improve understanding of users.

The enterpriser selection step is a step of displaying the acquired enterpriser information on a screen and selecting an enterpriser by a user. The enterpriser access step is performed through the selected information.

The enterpriser access step is a step for performing terminal authentication and service subscription through access to the enterpriser. Connection to the provisioning server is made through the enterpriser information selected at the previous step. A common protocol mechanism for this is needed. The Broadband Forum's standard TR-069 is the most commonly used protocol internationally, which may be applicable to this embodiment. Upon enterpriser access, terminal authentication is performed through the terminal information. As information delivered for the terminal authentication, there are a terminal ID assigned upon manufacturing, a manufacturer ID, a terminal model, MAC information and the like.

The enterpriser provisioning server requests the terminal authentication from a TA through the terminal information. Whether the terminal is an illegal terminal or not is verified by the TA, and when the terminal is the illegal terminal, the server informs the user of this, and the provisioning procedure is terminated.

After it has been checked that the terminal is not an illegal terminal through the service subscription and authentication steps, it is checked that the terminal has already subscribed. When the terminal has not subscribed, a guide for subscribing to services is announced on the screen. A common method for representation on the screen is needed. After subscribing to services has been performed through the announcement, the authentication step for subscribing to services is again performed and re-booting is initiated.

After authentication for the terminal and the user has been verified, a step of downloading and installing software additionally needed for each selected enterpriser is required. For this, the terminal requests an extended package list from the enterpriser provisioning server in order to install the extended package additionally needed for each enterpriser. The enterpriser provisioning server provides the extended package list needed for the terminal through the terminal information and service subscription information which are transmitted upon the terminal authentication. For this, definition for detail information is needed. It is needed that the extended package is downloaded to the terminal through provided information about the extended package. For this, definition for a download protocol is needed.

After the initiation of IPTV services, a procedure for service unsubscribing is performed through the selection for the enterpriser. In the service unsubscribing procedure, the extended package or information for the enterpriser related to a previous subscription are automatically deleted by performing the factory initialization of the terminal.

Figure 5:
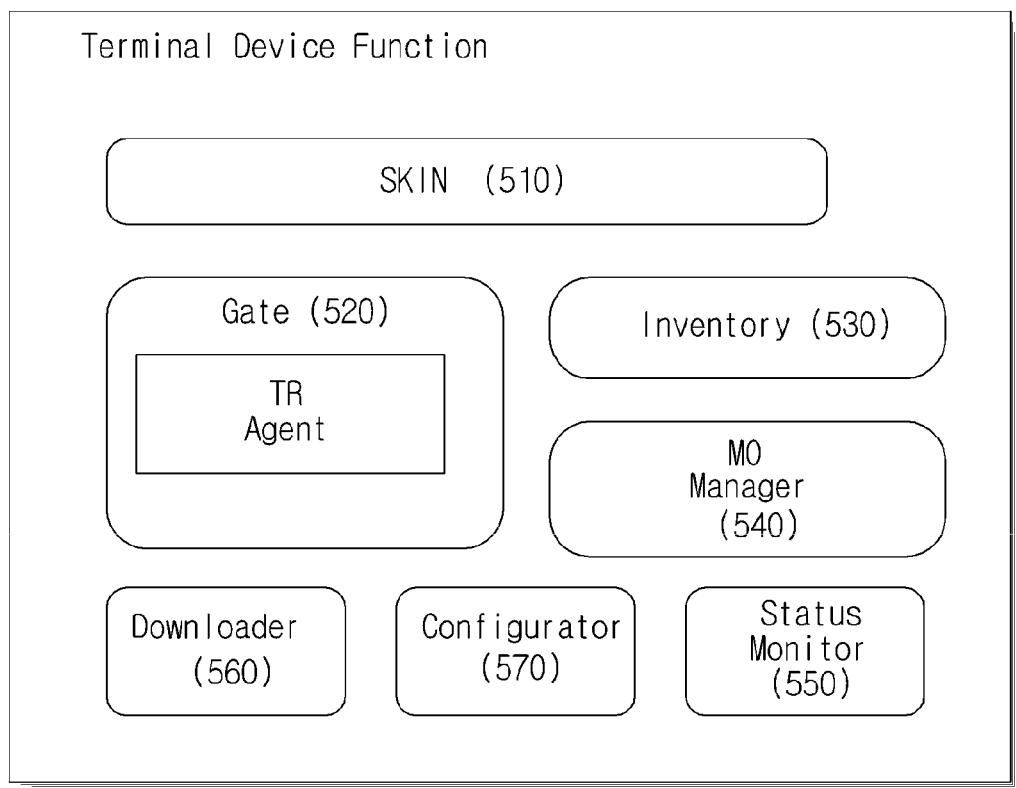
FIG. 5 is a diagram showing the internal structure of a terminal for management of the IPTV terminal.

The internal structure of the terminal for IPTV terminal management is as shown in FIG. 5. Among detail component modules, a SKIN 510 is a part for receiving and processing the instructions of internal components for interfaces with the outside. A Gate 520, which is in charge of communication, is a module for having agents for respective protocols for communication, such as TR Agent, SNMP Agent, FTP Agent and the like, and performing functions related thereto. An Inventory 530 is for managing and generating the terminal state specification and is needed for collecting terminal state information collected from other modules in real time and providing it to a module requesting it. A MO Manager 540 defines objects defined for terminal management referred to as Management Object, manages their respective states, and has the latest information. Through this, the Inventory 530 makes out the terminal state specification. A State Monitor 550 functions to collect the states of the terminal by substantially accessing hardware or an operating system (OS) for terminal state management. A Downloader 560 functions to collect and store software needed for the terminal from a server. A Configurator 570 functions to substantially perform terminal configuration instructions delivered from the Gate 520. The results of the performance are collected by the Status Monitor 550, and the information thereof is configured by the MO Manager 540 thereby organizing the terminal state specification through the Inventory 530.

Figure 6:
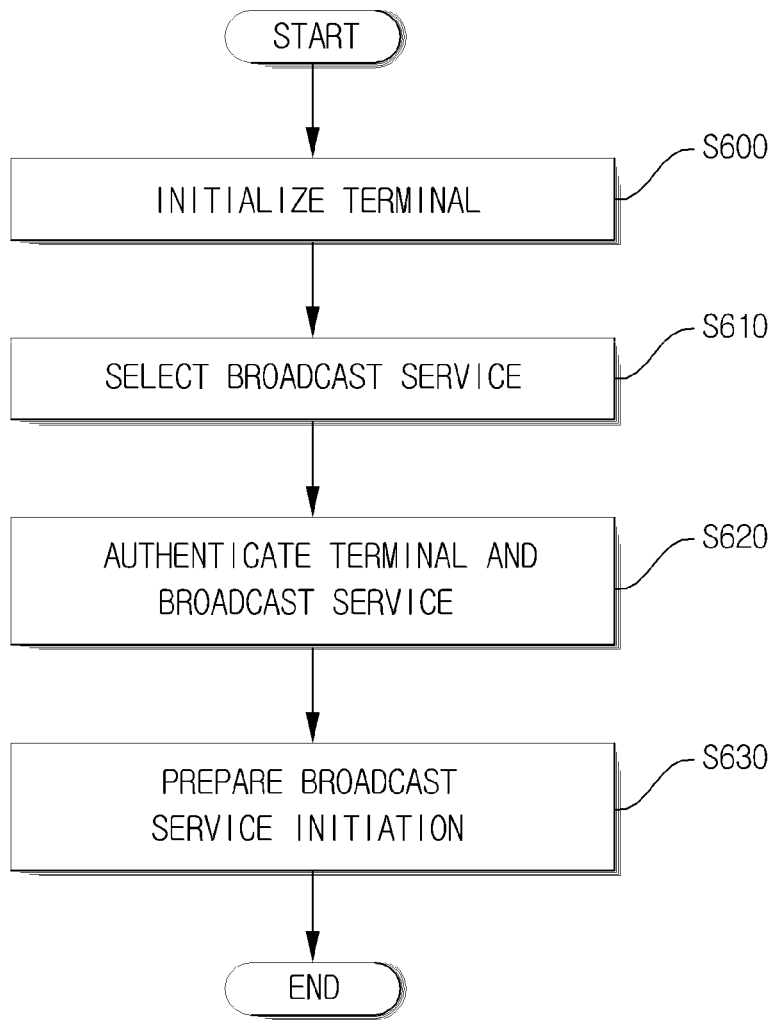
FIG. 6 is a flowchart illustrating a method for managing provisioning for a terminal according to an exemplary embodiment of the present invention.

Subsequently, the method for managing terminal provisioning of the system for managing terminal provisioning will be described. FIG. 6 is a flowchart illustrating a method for managing provisioning for a terminal according to an exemplary embodiment of the present invention. The detailed description will be described with reference to FIG. 6.

Most of all, a broadcast service provision terminal is initialized (initialization step, S600). In the exemplary embodiment, the initialization step (S600) may include a booting step, a network connection step and a stack initialization step. The booting step is a step of booting the terminal. The network connection step is a step of physically connecting the booted terminal to a network. The stack initialization step is a step of initializing software stacks for performing terminal provisioning on the terminal connected to the network.

After the initialization step (S600), a broadcast service, which is registered in the initialized terminal, is selected (broadcast selection step, S610).

Thereafter, the terminal for providing the selected broadcast service and the selected broadcast service are authenticated (authentication step, S620). In the exemplary embodiment, the authentication step (S620) may include a provisioning server connection step, a terminal authentication step, and a broadcast service authentication step. The provisioning server connection step is a step for connecting the provisioning server to a corresponding broadcaster based on broadcaster information about the broadcaster, which provides the selected broadcast service. The terminal authentication step is a step for authenticating the terminal depending on whether the terminal connected to the provisioning server is an illegal terminal. The broadcast service authentication step is a step for authenticating the broadcast service depending on whether the terminal connected to the provisioning server has subscribed to the broadcast service to be provided through the terminal connected thereto when the terminal is not an illegal terminal.

After the authentication step (S620), a service preparation procedure for providing the broadcast service authenticated via the authenticated terminal is performed (preparation procedure performance step, S630). In the exemplary embodiment, the preparation procedure performance step (S630) may include a list request step, a list generation step, and a package installation step. The list request step is a step for requesting a list of software packages related to the operation of the authenticated broadcast service. The list generation step is a step for generating the software package list requested based on authentication information used to authenticate the terminal and the broadcast service. The package installation step is a step for receiving and installing a corresponding software package based on the generated software package list.

Preferably, a subscription determination step may be performed as a step to be performed between the initialization unit (S600) and the broadcast selection step (S610). The subscription determination step is a step for determining whether to subscribe to the broadcast service to be provided through the initialized terminal. The subscription determination step may be performed before the initialization step (S600). Meanwhile, considering the case where subscription to the broadcast service to be provided is not made, a broadcaster information acquisition step and a broadcast service subscription step may be further performed. The broadcaster information acquisition step is a step for acquiring broadcaster information related to the corresponding broadcast service when subscription to the broadcast service to be provided is not made. The broadcast service subscription step is a step for subscribing to the corresponding broadcast service based on the acquired broadcaster information. The broadcaster information acquisition step and the broadcast service subscription step may be performed after the subscription determination step.

Preferably, a broadcast service initiation step or a broadcast service unsubscribing step may be performed after the preparation procedure performance step (S630). The broadcast service initiation step is a step for initiating the corresponding broadcast service when the service preparation procedure is terminated. The broadcast service unsubscribing step is a step for unsubscribing from the selected broadcast service of the broadcast services registered in the terminal. The broadcast service unsubscribing step is not necessarily limited to be performed after the preparation procedure performance step (S630).

Figure 7:
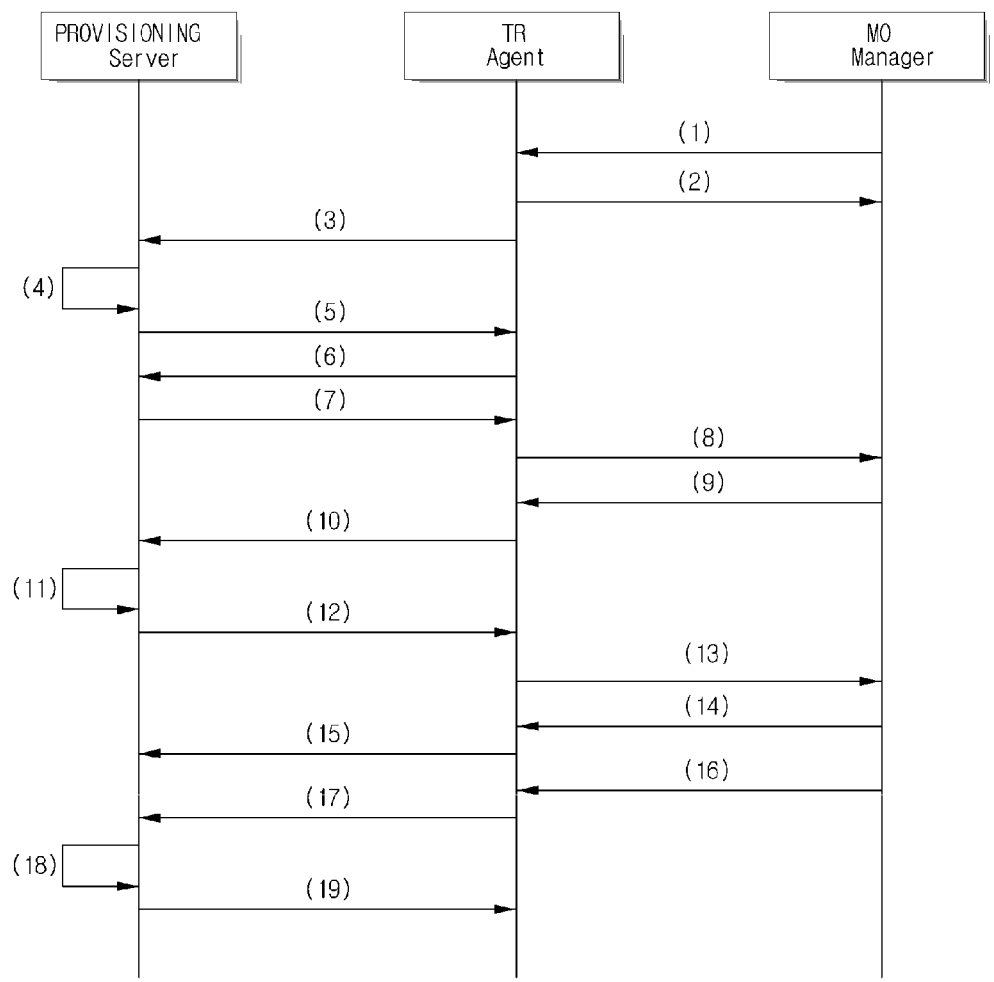
FIG. 7 is a flowchart showing a procedure of terminal management when a TR-069 based terminal subscribes to an IPTV service.
Figure 8:
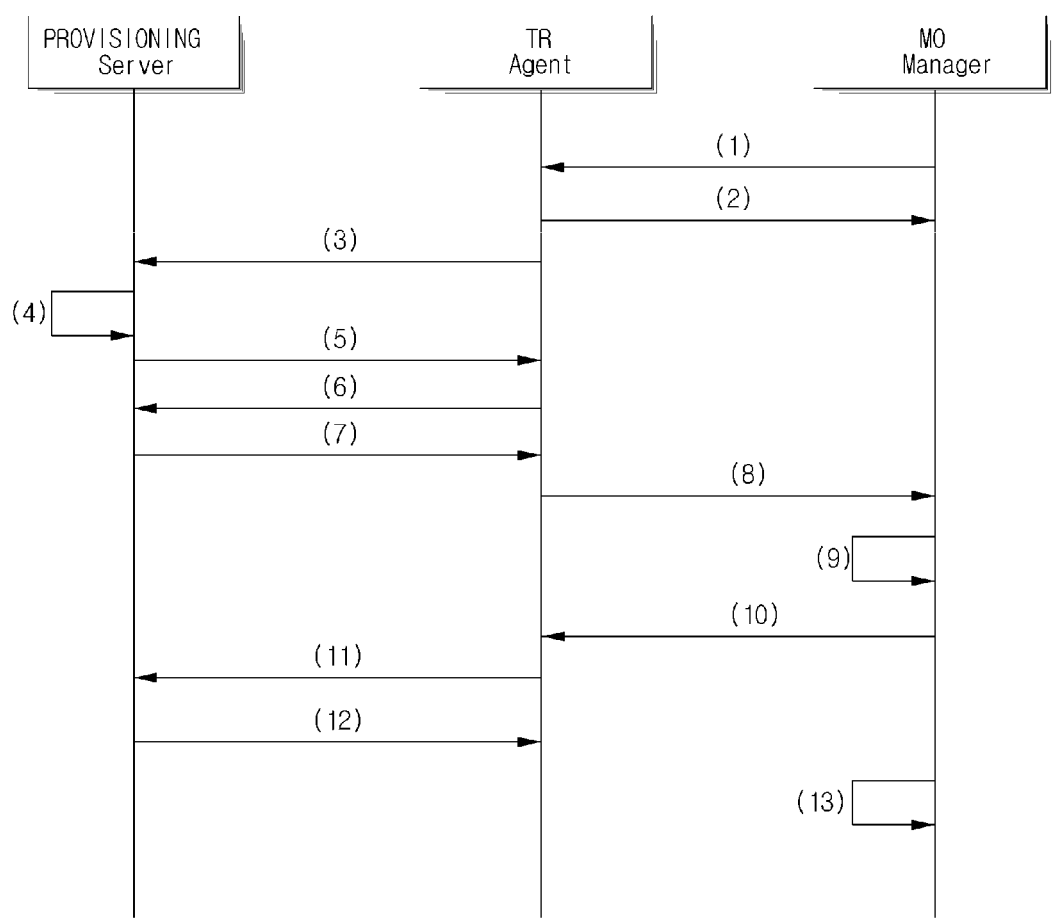
FIG. 8 is a flowchart showing a procedure of terminal management when a TR-069 based terminal does not subscribe to an IPTV service.
Figure 9:
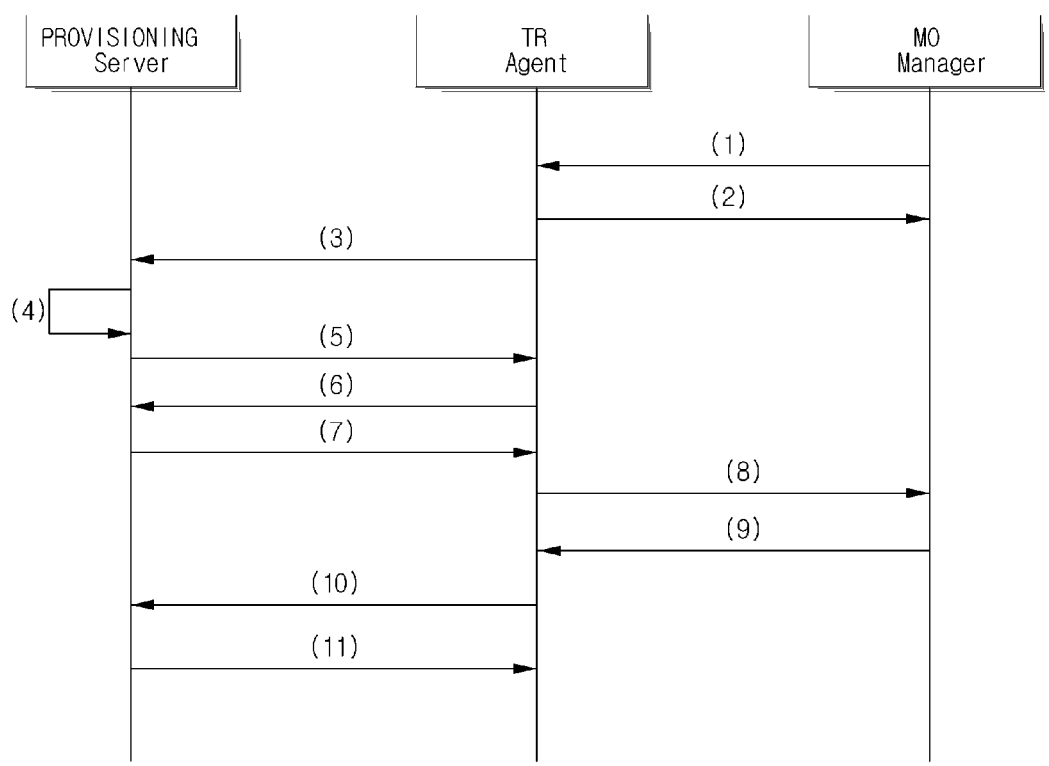
FIG. 9 is a flowchart showing a provisioning procedure when the user unsubscribes from the IPTV service and again attempts to receive the service.

Next, the preferred method for managing terminal provisioning is described by taking an example. FIGS. 7 to 9 show sequence diagrams for IPTV terminal configuration procedures. The following description will be described with reference to FIGS. 7 and 9.

FIG. 7 is a flowchart when subscription to an IPTV service has been made, which shows TR069 based terminal management procedures. For this, the TR Agent and the MO Manager of the internal modules of an IPTV terminal perform terminal configuration by exchanging messages.

Contents performed at steps 1 to 19 are as follow.
 1: EVENT_BOOT
 2: getMO
 3: Inform Request
 4: when subscription is already made, Loading RPCMethod
 5: Inform Response
 6: Empty Post
 7: RPCMethod Request—getParameterValues (extended package information)
 8: RPCMethod Processing—getParameterValues
 9: RPCMethod Processing results—getParameterValues
 10: RPCMethod Response—getParameterValues
 11: Analysis of extended package information—if required, Loading command for Download of extended packages,
 12: RPCMethod Request—Download (extended packages)
 13: RPCMethod Processing—Download
 14: RPCMethod Processing results—DownloadResponse
 15: RPCMethod Response—DownloadResponse
 16: TransferComplete
 17: TransferComplete message
 18: analysis of extended package information—if required, Download of extended packages, instruction Loading
 19: Download of additional extended packages or Empty Response Body FIG. 8 shows the case of a terminal which does not subscribe to the IPTV service among the TR069 based terminal management procedures. At step 7, the provisioning server causes terminal configuration to be performed after subscription to the service by requesting the terminal to subscribe to the IPTV service. Contents performed at steps 1 to 13 are as follow.
 1: EVENT_BOOT
 2: getMO
 3: Inform Request
 4: when subscription is not made—Loading RPCMethod
 5: Inform Response
 6: Empty Post
 7: RPCMethod Request—SetParameterValues (Subscription Request)
 8: RPCMethod Processing—SetParameterValues
 9: Output of guide message for subscription to User
 10: RPCMethod Processing results—SetParameterValuesResponse
 11: RPCMethod Response—SetParameterValuesResponse
 12: Empty Response Body
 13: when user select OK, shutdown FIG. 9 shows a provisioning procedure when the user unsubscribes from the IPTV service and again attempts to receive the service. In this case, the provisioning server recognizes a new provisioning after unsubscribing, and entirely initializes the state of a previously subscribed service by instructing the terminal to perform factory initialization. Contents performed at steps 1 to 11 are as follow.

1: EVENT_BOOT
2: getMO
3: Inform Request
4: In case of new provisioning after unsubscribing—Loading RPCMethod
5: Inform Response
6: Empty Post
7: RPCMethod Request—FactoryReset
8: RPCMethod Processing—FactoryReset
9: RPCMethod Processing Results—FactoryReset
10: RPCMethod Response—FactoryReset
11: Empty Body The present invention can enable the IPTV terminal to be extended from an existing set-top box to devices connectable to wired networks, such as a PC, a game console and the like, and can configure a terminal independent of enterprisers unlike existing terminals dependent to the enterprisers. Therefore, the present invention is expected to contribute to improving IPTV services. The present invention can be applicable to enhancing IPTV functions, middleware for service extension, security platforms or the like.

The spirit of the present invention has been just exemplified. It will be appreciated by those skilled in the art that various modifications, changes, and substitutions can be made without departing from the essential characteristics of the present invention. Accordingly, the embodiments disclosed in the present invention and the accompanying drawings are used not to limit but to describe the spirit of the present invention. The scope of the present invention is not limited only to the embodiments and the accompanying drawings. The protection scope of the present invention must be analyzed by the appended claims and it should be analyzed that all spirits within a scope equivalent thereto are included in the appended claims of the present invention.

What is claimed is:

1. A system for managing terminal provisioning, comprising:
   an initialization unit configured to initialize a broadcast service provision terminal;
   a broadcast selection unit configured to select a broadcast service registered in the initialized broadcast service provision terminal;
   an authentication unit configured to authenticate the broadcast service provision terminal for providing the selected broadcast service and authenticate the selected broadcast service; and
   a preparation procedure performance unit configured to perform a service preparation procedure for providing the authenticated broadcast service through the authenticated broadcast service provision terminal,
   wherein the preparation procedure performance unit includes:
   a list request unit configured to request a software package list related to operation of the authenticated broadcast service;
   a list generation unit configured to generate the software package list requested based on authentication information used to authenticate the broadcast service provision terminal and the selected broadcast service; and
   a package installation unit configured to receive and install a corresponding software package based on the generated software package list.

2. The system of claim 1, further comprising a subscription determination unit configured to determine whether a subscription to the selected broadcast service to be provided through the initialized broadcast service provision terminal is made.

3. The system of claim 2, further comprising:
   a broadcaster information acquisition unit configured to acquire broadcaster information related to a corresponding broadcast service when subscriber to the selected broadcast service to be provided is not made; and
   a broadcast service subscription unit configured to subscribe to the corresponding broadcast service based on the acquired broadcaster information.

4. The system of claim 1, wherein the authentication unit includes:
   a provisioning server connection unit configured to connect the broadcast service provision terminal to a provisioning server of a corresponding broadcaster based on broadcaster information about the broadcaster which provides the selected broadcast service;
   a terminal authentication unit configured to authenticate the broadcast service provision terminal depending on whether the broadcast service provision terminal connected to the provisioning server is an illegal terminal; and
   a broadcast service authentication unit configured to authenticate the selected broadcast service depending on whether the broadcast service provision terminal connected to the provisioning server subscribes to the selected broadcast service to be provided through the broadcast service provision terminal connected thereto when the broadcast service provision terminal is not an illegal terminal.

5. The system of claim 1, wherein the initialization unit includes:
   a booting unit configured to boot the broadcast service provision terminal;
   a network connection unit configured to physically connect the booted broadcast service provision terminal to a network; and
   a stack initialization unit configured to initialize software stacks for performance of terminal provisioning on the broadcast service provision terminal connected to the network.

6. The system of claim 1, further comprising any of:
   a broadcast service initiation unit configured to initiate a corresponding broadcast service when the service preparation procedure is terminated; and
   a broadcast service unsubscribing unit configured to unsubscribe from the selected broadcast service of broadcast services registered in the broadcast service provision terminal.

7. The system of claim 1, wherein the broadcast service provision terminal is an IPTV terminal, and includes:
   a communication unit including agents configured to process different communication protocols, the communication unit being configured to perform communication using the agents included therein;
   a first instruction processing unit configured to process terminal configuration instructions received through the agents;
   a terminal state collection unit configured to collect state information of the broadcast service provision terminal in real time by accessing a module of the broadcast service provision terminal for performing a corresponding process whenever the terminal configuration instruction are processed;
   an object definition unit configured to define objects for terminal management based on the collected state information; and a terminal state specification generation unit configured to generate terminal state specifications based on the defined objects.

8. The system of claim 7, wherein the broadcast service provision terminal further includes:
a second instruction processing unit configured to process instructions of internal components for interfacing with the outside; and
a software storing unit configured to collect and store software to operate the broadcast service provision terminal.

9. A method for managing terminal provisioning of a broadcast service provision terminal, the method comprising:
initializing the broadcast service provision terminal;
selecting a broadcast service registered in the initialized broadcast service provision terminal;
authenticating the broadcast service provision terminal for providing the selected broadcast service and authenticating the selected broadcast service; and
performing a service preparation procedure for provisioning the authenticated broadcast service through the authenticated broadcast service provision terminal;
wherein performing the service preparation procedure comprises:
requesting a software package list related to operation of the authenticated broadcast service;
generating the software package list requested based on authentication information used to authenticate the broadcast service provision terminal and the selected broadcast service; and
receiving and installing a corresponding software package based on the generated software package list.

10. The method of claim 9, further comprising determining whether subscription to the selected broadcast service to be provided through the initialized broadcast service provision terminal is made.

11. The method of claim 10, further comprising:
acquiring broadcaster information related to a corresponding broadcast service when subscription to the selected broadcast service to be provided is not made; and
subscribing to the corresponding broadcast service based on the acquired broadcaster information.

12. The method of claim 9, wherein the authentication step includes:
connecting to a provisioning server of a corresponding broadcaster based on broadcaster information about the broadcaster which provides the selected broadcast service;
authenticating the broadcast service provision terminal depending on whether the broadcast service provision terminal connected to the provisioning server is an illegal terminal; and
authenticating the broadcast service depending on whether the broadcast service provision terminal connected to the provisioning server subscribes to the selected broadcast service to be provided through the broadcast service provision terminal connected thereto when the broadcast service provision terminal is not an illegal terminal.

13. The method of claim 9, wherein initializing the broadcast service provision terminal includes:
booting the broadcast service provision terminal;
physically connecting the booted broadcast service provision terminal to a network; and
initializing software stacks to perform terminal provisioning on the broadcast service provision terminal connected to the network.

14. The method of claim 9, further comprising:
initiating a corresponding broadcast service when the service preparation procedure is terminated.

15. The method of claim 9, further comprising:
unsubscribing from the selected broadcast service of broadcast services registered in the broadcast service provision terminal.

* * * * *